(12) United States Patent
Fiedler et al.

(10) Patent No.: US 11,152,133 B2
(45) Date of Patent: Oct. 19, 2021

(54) CABLE ROUTING SYSTEM

(71) Applicants: Kevin Fiedler, Uhlstadt-Kirchhasel (DE); Arnd Kuchenbecker, Saalfeld (DE); Carmen Ludwig, Saalfeld (DE); Dieter Seifert, Saalfeld (DE)

(72) Inventors: Kevin Fiedler, Uhlstadt-Kirchhasel (DE); Arnd Kuchenbecker, Saalfeld (DE); Carmen Ludwig, Saalfeld (DE); Dieter Seifert, Saalfeld (DE)

(73) Assignee: TRUMPF MEDIZIN SYSTEME GMBH + CO. KG, Saalfeld (DE)

( * ) Notice: Subject to any disclaimer, the term of this patent is extended or adjusted under 35 U.S.C. 154(b) by 0 days.

(21) Appl. No.: 16/456,693

(22) Filed: Jun. 28, 2019

(65) Prior Publication Data
US 2020/0027627 A1    Jan. 23, 2020

(30) Foreign Application Priority Data
Jul. 5, 2018    (EP) .................................... 18182004

(51) Int. Cl.
| | | |
|---|---|---|
| *F16L 3/00* | (2006.01) | |
| *H01B 5/00* | (2006.01) | |
| *H01R 11/09* | (2006.01) | |
| *A61G 7/015* | (2006.01) | |

(52) U.S. Cl.
CPC ............. *H01B 5/002* (2013.01); *H01R 11/09* (2013.01); *A61G 7/015* (2013.01)

(58) Field of Classification Search
CPC ....... H02G 11/006; F16G 13/16; H01R 11/00; H01R 11/03; H01R 11/01; H01R 11/09; H01B 5/002
See application file for complete search history.

(56) References Cited

U.S. PATENT DOCUMENTS

| | | | | |
|---|---|---|---|---|
| 6,215,068 | B1 * | 4/2001 | Meier ................... | H02G 11/00 174/68.1 |
| 6,725,642 | B2 * | 4/2004 | Tsutsumi ............... | F16G 13/16 248/49 |
| 7,204,075 | B2 * | 4/2007 | Utaki ..................... | F16G 13/16 248/49 |
| 7,310,937 | B2 * | 12/2007 | Kim ....................... | F16G 13/16 248/49 |
| 9,083,159 | B2 * | 7/2015 | Takeuchi ............. | H02G 3/0475 |
| 9,328,795 | B2 * | 5/2016 | Blase ................... | H02G 3/0475 |
| 10,823,256 | B2 * | 11/2020 | Chen ...................... | F16G 13/16 |
| 2002/0092662 | A1 | 7/2002 | Grant et al. | |
| 2006/0112671 | A1 * | 6/2006 | Blase ..................... | F16G 13/16 59/78.1 |
| 2007/0218829 | A1 | 9/2007 | Utaki et al. | |

(Continued)

FOREIGN PATENT DOCUMENTS

| | | |
|---|---|---|
| CH | 704643 A2 | 9/2012 |
| EP | 0789167 | 8/1997 |

(Continued)

*Primary Examiner* — Amy J. Sterling
(74) *Attorney, Agent, or Firm* — Barnes & Thornburg LLP

(57) ABSTRACT

A cable routing system is provided. The cable routing system comprises a flexible flat band being able to be deformed from its stretched out shape without assuming a permanent changed form and several attaching devices in intervals along a longitudinal direction of the band for attaching a cable to the band in a sliding manner.

20 Claims, 3 Drawing Sheets

(56) References Cited

U.S. PATENT DOCUMENTS

2012/0267164 A1* 10/2012 Reuss ................. H02G 3/0487
              174/70 R
2013/0075130 A1  3/2013 Kaihostu et al.
2015/0141756 A1* 5/2015 Cheng ................. A61B 1/0016
              600/146

FOREIGN PATENT DOCUMENTS

| EP | 2446513 | 6/2015 |
| EP | 2977152 | 1/2016 |
| WO | WO2010/150172 | 12/2010 |
| WO | WO2011/092991 | 8/2011 |

* cited by examiner

CABLE ROUTING SYSTEM

CROSS-REFERENCE TO RELATED APPLICATIONS

This application claims the benefit of European Patent Application Serial No. 18182004.4, filed on Jul. 5, 2018, the entire disclosure of which is incorporated herein by reference.

BACKGROUND

The present disclosure relates to a cable routing system, in particular, to cable routing system for use in a medical apparatus.

Heretofore, cable routing systems, e.g., embodied as cable chains are known. These cable chains are able to route the cables by being bent around axes perpendicular to their longitudinal direction, however, coming from their stretched out shape, the cable chains can merely be bent in one direction. Furthermore, reduction of a bending radius is limited by the structure of the chain such that a space necessary in use of the cable chain is relatively large.

However, due to constructive framework conditions, i.e. design requirements and a huge quantity of desired functions of an apparatus, an available space for routing cables has become small such that the cable chains cannot or merely hardly fulfill the requirements.

Therefore, the object underlying the present disclosure is to provide a cable routing system eliminating the above-mentioned disadvantages and enabling cable routing in a small and flexible space. The object is achieved by a cable routing system and a medical apparatus according to the present disclosure.

SUMMARY

According to an aspect of the present disclosure, a cable routing system comprises a flexible flat band configured to be able to be deformed from its stretched out shape without assuming a permanent changed form and several attaching devices provided in predetermined intervals along a longitudinal direction of the band for attaching a cable to the band in a sliding manner.

By this configuration, cables to be routed by the cable routing system can be attached to the band such that the cables can follow any deformation of the band. Coming from a rest position, in case of a reciprocating motion of at least one end of the band, the shape of the band automatically returns to its rest position. By the attaching devices, the cables are not rigidly fixed to the band but they can longitudinally move with respect to the band while merely departing from the band in a small range enabled by the attaching devices.

In one implementation of the cable routing system, in a stretched out rest position, the band is configured to be bent around axes in a direction perpendicular to the longitudinal direction of the band in arbitrary directions.

Due to this configuration, the band can function as a common cable chain, nevertheless, it has portions of the band being in their stretched out shape that can be bent in both directions so that they can be flexibly deformed. Furthermore, the bending radius of the cable routing system is not limited by a structure of the cable chain but, merely, the material thickness and the diameter of the cables define the bending radius such that it can be reduced in view of cable chains.

In a further implementation of the cable routing system, the band is configured to be twistable around an axis in the longitudinal direction of the band.

By this characteristic, the cables cannot only be routed upon a longitudinal motion of the ends of the band with respect to each other but, also, when the ends of the band are attached to components of an apparatus which are twisted with respect to each other. By superimposing the bending and the twisting, the cables routed by cable routing system can follow arbitrary motions of the components with respect to each other.

In a further implementation of the cable routing system, the attaching devices are respectively provided with at least one protrusion protruding from at least one of an upper side and a lower side of the band and with a holding element attached to the at least one protrusion and extending at least partially across the width of the band along a side of the band.

This configuration enables a simple attachment of the cables to the band. The protrusion can be easily formed by punching and reshaping and the holding element can easily be attached to the protrusion while generating a necessary distance for attaching a required quantity of the cables in the sliding manner.

In another implementation of the cable routing system, the attaching devices are respectively provided with two protrusions and the holding element comprises a pin attached to the two protrusions or a molded part clipped on the two protrusions.

By attaching of the cables by the pin attached to the two protrusions or by the molded part clipped on the protrusions, an easy, reliable and stable attachment of the cables is enabled.

In a further implementation of the cable routing system, the pin is attached to the protrusions in a rotatable manner around its axis.

Due to the rotatable attachment of the pin to the protrusions, even though the cable abuts to the pins, static friction between the cable and the pin is compensated so that the cable can easily be shifted with respect to the cable routing system.

In a further implementation of the cable routing system, the band is made of carbon fiber.

The band being made of carbon fiber provides that the band is highly flexible and, when adding conductive components, the band has a permanent flexible conductive characteristic.

In a further implementation of the cable routing system, the band is made of spring steel.

The band being made of spring steel provides that the band is highly flexible and conductive. Furthermore, spring steel as material can be easily purchased.

In a further implementation of the cable routing system, the band is configured to be electrically conductive.

By this characteristic of the band, further functions can be integrated in the cable routing system in order to reduce manufacturing costs.

In a further implementation of the cable routing system, the band is provided with at least one electrical connection device.

By the provision of one electrical connection device, the band can be connected to connector in order to provide an EMC protection.

In a further implementation of the cable routing system, the band is provided with several electrical connection devices respectively arranged in areas of ends of the band in the longitudinal direction.

Upon this configuration, the band can replace a protective earth conductor so that, on the one hand, a protection is ensured along the course of the cable in the cable routing system in case that the insulation of the cable is damaged and, on the other hand, the apparatus can be constructed easier and cost-effective.

According to a further aspect of the present disclosure, a medical apparatus comprises the cable routing system.

In particular, in medical apparatuses provided with movable components, the requirements, on the one hand, for reducing the size of the apparatuses due to accessibility of patients and, on the other hand, for integrating more functions which require a comprehensive cabling exist. By the use of the cable routing system according to the present disclosure in the medical apparatus, available free installation space can be flexibly utilized in order to route the cables therein.

In an implementation of the medical apparatus, the medical apparatus comprises two holding devices, and the holding devices and the cable routing system, in areas of ends of the band in its longitudinal direction, respectively comprise a junction device such that the band is movable with respect to at least one of the holding devices by the junction device.

Due to the movable conjunction by the junction device of the holding device and the cable routing system, the band can be flexibly attached to the holding devices and, therefore, can flexibly enter into the available free installation space.

In an implementation of the medical apparatus, the band is rotatable around an axis perpendicular to the longitudinal direction of the band at the junction device.

By the rotatory conjunction device, the band can flexibly enter into the available free installation space in case of a translation of the components movable to each other and joined to the cable routing system.

In an implementation of the medical apparatus, the medical apparatus comprises two holding devices and a deflection device configured to deflect the cable routing system when the holding devices are moved with respect to each other.

By the deflection device, the cable routing system attached to the two holding devices can be guided in a required manner. E.g., it can be guided into a free installation space which extends in a direction which is not in a direction of the motion of the movable components with respect to each other.

BRIEF DESCRIPTION OF THE DRAWINGS

Now, the invention is elucidated by means of an embodiment referring to the attached drawings.

In particular.

DETAILED DESCRIPTION OF THE DRAWINGS

Figure 1:
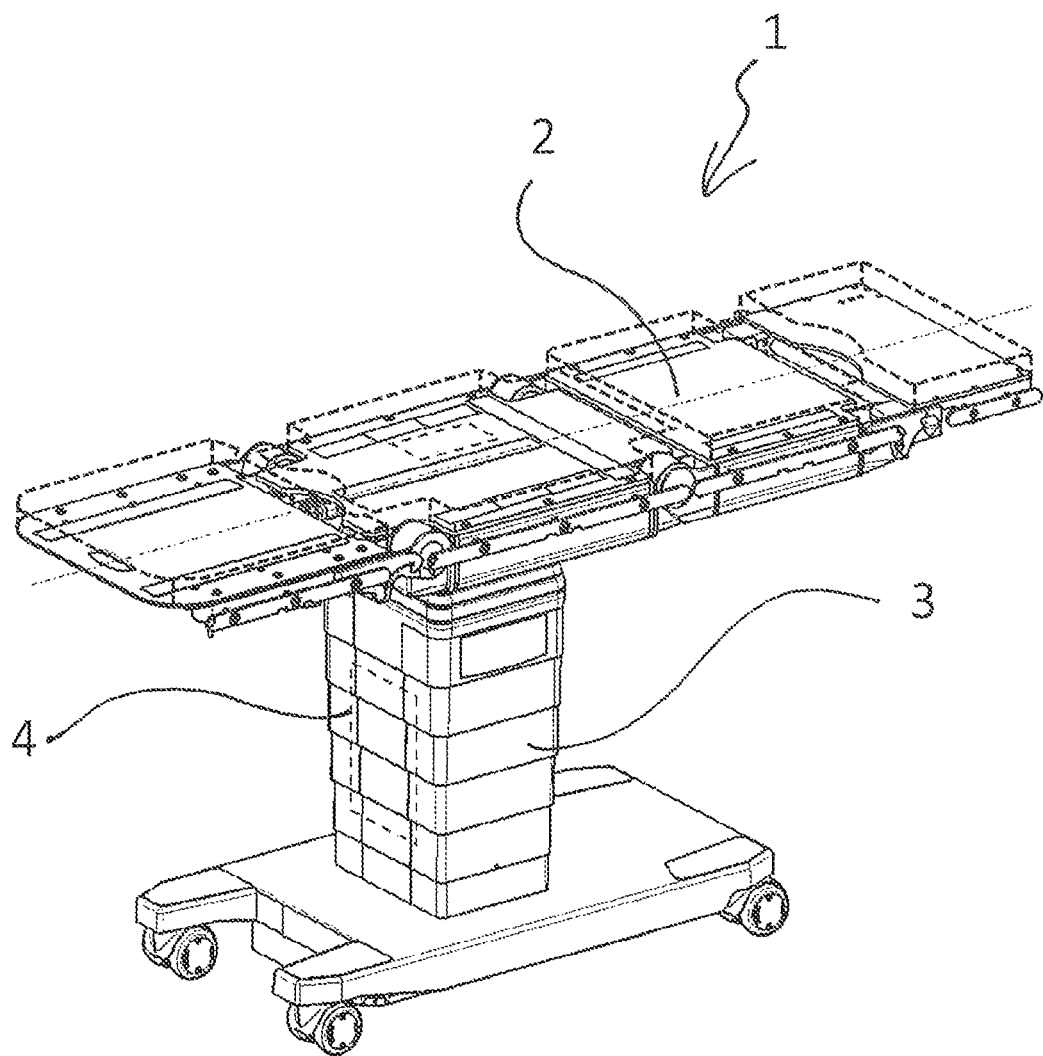
FIG. 1 shows a medical apparatus in the form of an operating table.

FIG. 1 shows a medical apparatus 1 in the form of an operating table. The medical apparatus 1 comprises a tabletop 2 and a height-adjustable column 3 supporting the tabletop 2. The tabletop 2 and a base of the column 3 are movable with respect to each other. Furthermore, the medical device 1 comprises a cable routing system 4 according to the present disclosure.

Figure 2:
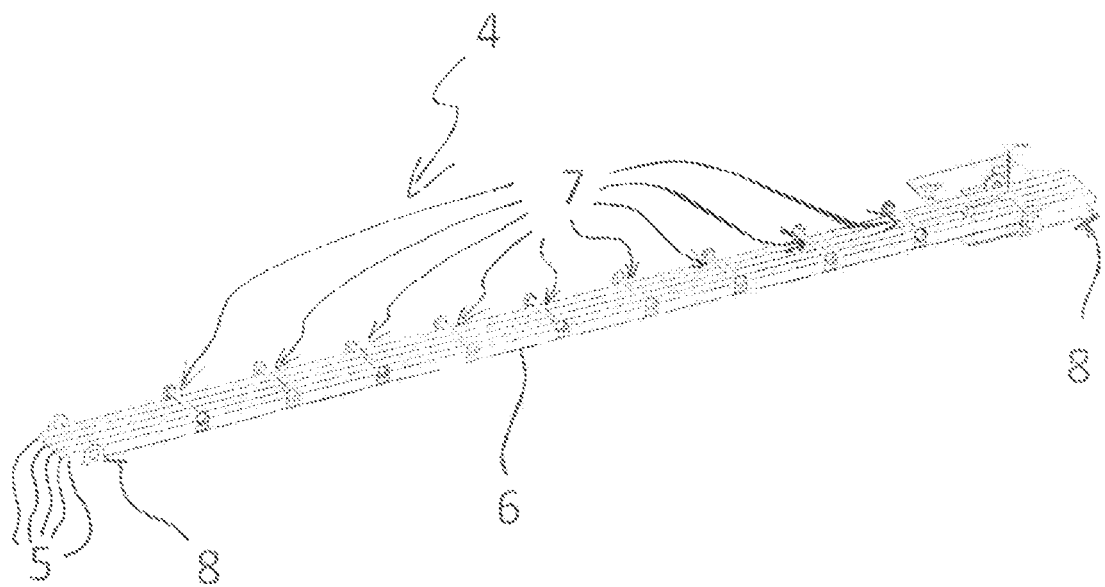
FIG. 2 shows a cable routing system according to the present disclosure and cables attached to the cable routing system.

FIG. 2 shows the cable routing system 4 and cables 5 attached to the cable routing system 4. The cable routing system 4 comprises a flexible flat band 6 being able to be deformed from its stretched out shape without assuming a permanent changed form and several attaching devices 7 in intervals along a longitudinal direction of the band 6 for attaching the cables 5 to the band in a sliding manner. In the embodiment shown in FIG. 2, five cables 5 are attached to the cable routing system 4, however, in alternative embodiments, at least one cable 5 up to a respectively maximum possible quantity is attached to the cable routing system 4.

The band 6 is made of spring steel. Alternatively, the band 6 is made of carbon fiber or of another suitable material providing a high flexibility and a sufficient strength and stiffness. The band 6 is electrically conductive and it is provided with several electrical connection devices 8 arranged in areas of ends of the band 6 in the longitudinal direction. Alternatively, the band 6 is merely provided with one electrical connection device 8 for providing EMC protection or more than two electrical connection devices 8 are provided such that components of the medical apparatus 1 midway between the ends can be conductively joined to the cable routing system 4.

Figure 3:
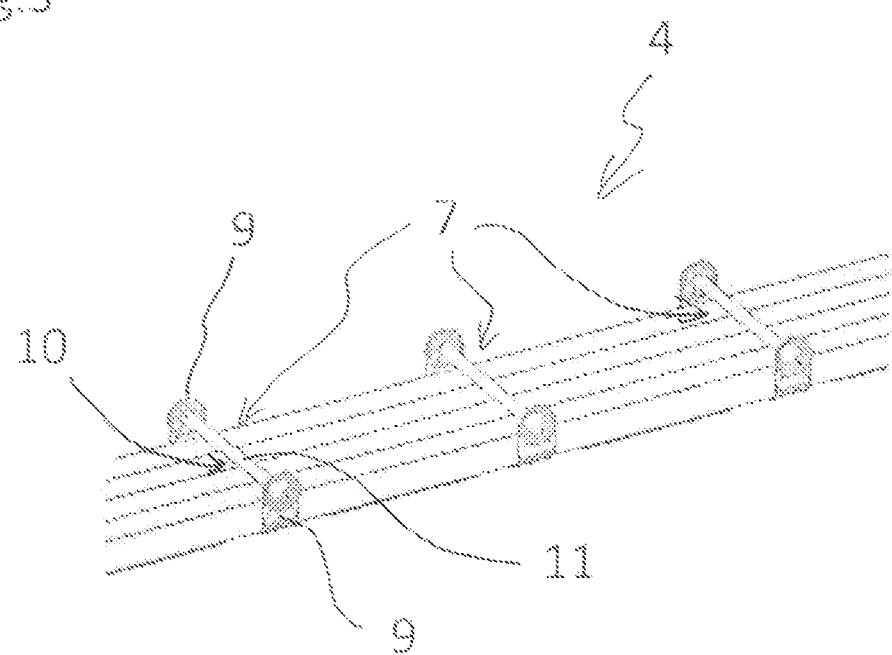
FIG. 3 shows an enlarged portion of the cable routing system of FIG. 2.

FIG. 3 shows an enlarged portion of the cable routing system 4 of FIG. 2. The attaching devices 7 are respectively provided with two protrusions 9 protruding from at least one of an upper side and a lower side of the band 6. Furthermore, the attaching devices 7 are respectively provided with a holding element 10 attached to the two protrusions 9. The holding element 10 extends across the width of the band 6 along a side of the band 6. In alternative embodiments, the attaching devices 7 are not respectively provided with two protrusions 9 but at least one protrusion 9 is provided or more than two protrusions 9 are provided. Furthermore, in alternative embodiments, the holding element 10 does not extend across the width of the band 6 but it extends at least partially across the width of the band 6.

The holding element 10 comprises a pin 11 attached to the two protrusions 9. The pin 11 is attached to the protrusions 9 in a rotatable manner around its axis. Alternatively, the pin 11 is not rotatably attached to the protrusions 9 but, for reducing static friction between the cable 5 and the pin 11, the pin 11 is, e.g., provided with a slide coating or with a rotatable bushing. In a further alternative embodiment, instead of the pin 11, the holding element 10 comprises a molded part to be clipped on the two protrusions 9. The molded part has a surface for reducing friction.

Figure 4:
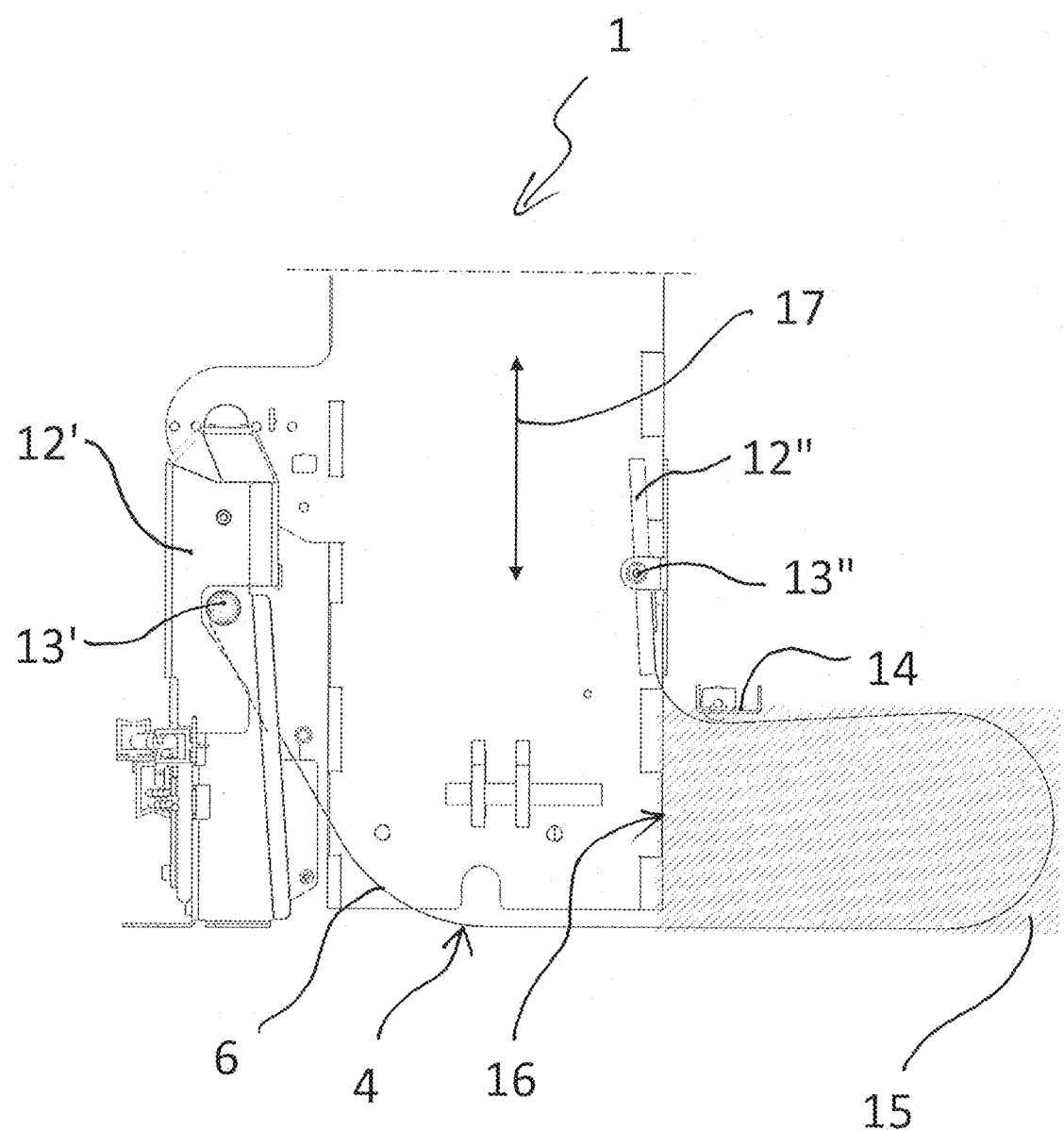
FIG. 4 shows a schematic view of a portion of the medical apparatus of FIG. 1 including the cable routing system.

FIG. 4 shows a schematic view of a portion of the medical apparatus 1 including the cable routing system 4.

The medical apparatus 1 comprises two holding devices 12', 12". One of the holding devices 12' is attached to the column 3 (FIG. 1) and the other holding device 12" is attached to a mechanical structure of the tabletop 2 (FIG. 1). Alternatively, the holding devices 12', 12" can be attached to other components of the medical apparatus 1 movable with respect to one another. The holding devices 12', 12" and the cable routing system 4, in areas of ends of the band 6 in its longitudinal direction, respectively comprise a junction device 13', 13" such that the band 6 is movable with respect to the holding devices 12', 12" at the junction devices 13', 13". Alternatively, only one junction device 13', 13" enables that the band 6 is movable with respect to one of the holding devices 12', 12" at the junction devices 13', 13" or the band 6 is not movable with respect to the holding devices 12', 12" at the junction devices 13', 13". The movability of the band 6 with respect to the holding devices 12', 12" is a rotation around an axis perpendicular to the longitudinal direction of the band 6 at the junction device 13', 13", however, in alternative embodiments, the motion can be a rotation around another axis.

Moreover, the medical apparatus 1 comprises a deflection device 14 deflecting the cable routing system 4 when the holding devices 12', 12" are moved with respect to one another. Along its course in the longitudinal direction, the band 6 is bent around axes in a direction perpendicular to the longitudinal direction of the band 6.

Furthermore, as to be seen in FIG. 3, the cable routing system 4 is guided into a free installation space 15. Starting at an opening 16 where the cable routing system 4 enters into the installation space 15, the installation space 15 extends in a direction which is not a direction of the motion of the movable components with respect to one another, i.e., the tabletop 2 with respect to the column 3, as shown by an arrow 17.

In use, when translating the components of the medical apparatus 1 with respect to one another, e.g., when, in FIG. 3, the right-hand holding device 12" is translated upwardly with respect to the left-hand holding device 12', the band 6 of the cable routing system 4 is moved out of the free installation space 15. Thereby, the band 6 is deflected by the deflection device 14. On the other hand, when the right-hand holding device 12" is translated downwardly with respect to the left-hand holding device 12', the band 6 enters into the free installation space 15 by being deflected by the deflection device 14. By the rotatory conjunction to the holding devices 12', 12", the band 6 can flexibly enter into the available free installation space 15 in case of the translation of the components.

While the invention has been illustrated and described in detail in the drawings and the foregoing description, such illustration and description are to be considered illustrative or exemplary and not restrictive. The invention is not limited to the disclosed embodiment. From reading the present disclosure, other modifications will be apparent to a person skilled in the art. Such modifications may involve other features, which are already known in the art and may be used instead of or in addition to features already described herein. In the claims, the word "comprising" does not exclude other elements or steps, and the indefinite article "a" or "an" does not exclude a plurality.

The invention claimed is:

1. A cable routing system, comprising
a flexible flat band configured to be able to be deformed from its stretched out shape without assuming a permanent changed form, and
several attaching devices provided in predetermined intervals along a longitudinal direction of the band for attaching a cable to the band in a sliding manner,
wherein the band automatically returns to its rest position after being deformed.

2. The cable routing system of claim 1, wherein, in a stretched out rest position, the band is configured to be bent around axes in a direction perpendicular to the longitudinal direction of the band in arbitrary directions.

3. The cable routing system of claim 2, wherein the band is made of spring steel.

4. The cable routing system of claim 3, wherein the attaching devices are respectively provided with at least one protrusion protruding from at least one of an upper side and a lower side of the band and with a holding element attached to the at least one protrusion and extending at least partially across the width of the band along a side of the band.

5. The cable routing system of claim 4, wherein the attaching devices are respectively provided with two protrusions and the holding element comprises a pin attached to the two protrusions or a molded part configured to be clipped on the two protrusions.

6. The cable routing system of claim 1, wherein the band is made of carbon fiber.

7. The cable routing system of claim 6, wherein the band is provided with at least one electrical connection device.

8. The cable routing system of claim 7, wherein the band is provided with several electrical connection devices respectively arranged in areas of ends of the band in the longitudinal direction.

9. The cable routing system of claim 6, wherein the band is configured to be electrically conductive.

10. The cable routing system of claim 4, wherein the band is provided with at least one electrical connection device.

11. The cable routing system of claim 10, wherein the band is provided with several electrical connection devices respectively arranged in areas of ends of the band in the longitudinal direction.

12. The cable routing system of claim 4, wherein the attaching devices are respectively provided with two protrusions and the holding element comprises a pin attached to the two protrusions configured to be clipped on the two protrusions.

13. The cable routing system of claim 12, wherein the pin is attached to the protrusions in a rotatable manner around its axis.

14. The cable routing system of claim 2, wherein the attaching devices are respectively provided with at least one protrusion protruding from at least one of an upper side and a lower side of the band and with a holding element attached to the at least one protrusion and extending at least partially across the width of the band along a side of the band.

15. The cable routing system of claim 2, wherein the band is made of carbon fiber.

16. The cable routing system of claim 15, wherein the band is provided with at least one electrical connection device.

17. The cable routing system of claim 16, wherein the band is provided with several electrical connection devices respectively arranged in areas of ends of the band in the longitudinal direction.

18. The cable routing system of claim 15, wherein the band is configured to be electrically conductive.

19. The cable routing system of claim 1, wherein the attaching devices are respectively provided with at least one protrusion protruding from at least one of an upper side and a lower side of the band and with a holding element attached to the at least one protrusion and extending at least partially across the width of the band along a side of the band.

20. The cable routing system of claim 19, wherein the band is provided with at least one electrical connection device.

* * * * *